United States Patent [19]

Lindh

[11] Patent Number: 5,029,055
[45] Date of Patent: Jul. 2, 1991

[54] PORTABLE LIGHT

[76] Inventor: Göran Lindh, Förmansgatan 9, S-582 66 Linköping, Sweden

[21] Appl. No.: 452,157

[22] Filed: Dec. 18, 1989

[51] Int. Cl.[5] .............................................. F21L 11/00
[52] U.S. Cl. ..................................... 362/191; 362/72; 362/700; 362/394; 362/396; 362/800
[58] Field of Search ................ 362/72, 191, 200, 226, 362/310, 368, 394, 396, 800, 158

[56] References Cited

U.S. PATENT DOCUMENTS 3,953,722  4/1976  Stick ..................................... 362/191
4,711,107 12/1987  Drane ............................... 362/72 X
4,860,177  8/1989  Simms ................................. 362/72

Primary Examiner—Stephen F. Husar
Attorney, Agent, or Firm—Pollock, Vande Sande & Priddy

[57] ABSTRACT

Light, which includes a reflector, batteries and a light emitting diode. The light emitting diode and the batteries are hermetically encased between a glass, that also serves as a reflector, and a rear wall of the light. The batteries and the light emitting diode are connected in series with two metallic plates that extend through the rear wall of the light. When the light is mounted on its bracket that in turn is fastened to for instance a bicycle this fastening bracket being metallic contacts the plates closing the circuit and lighting the light emitting diode. Due to the high efficiency of the light emitting diode it will be capable to burn a very long time before the batteries have to be changed and since the light in order to be lighted or unlighted is mounted or demounted possible oxide layers will always be worn away by this motion.

11 Claims, 3 Drawing Sheets

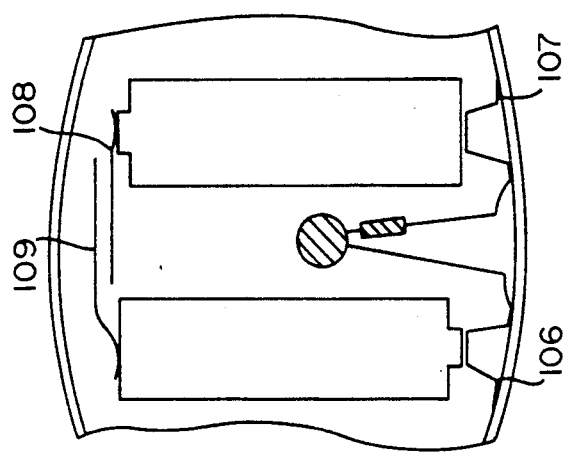
FIG. 7
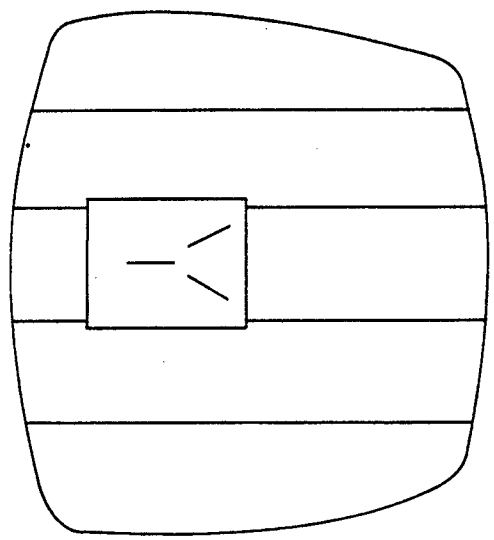
FIG. 8
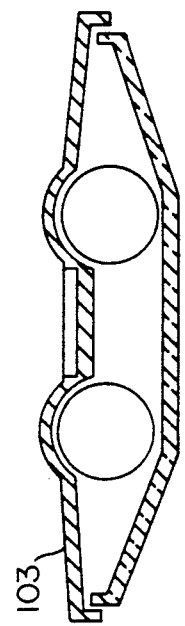
FIG. 6
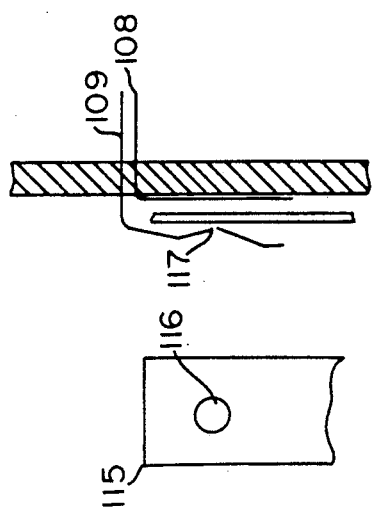
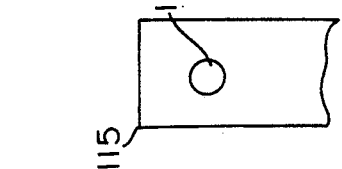
FIG. 10   FIG. 9

PORTABLE LIGHT

BACKGROUND OF THE INVENTION

1. Field of the Invention

The present invention is concerned with an electrical light and especially a light that is not prone to disruptions in its circuits by weather conditions and is easy to carry along.

2. Background Art

When travelling with a bicycle in darkness or semi-darkness it is of paramount importance that the bicycle is easily and at long distance detectable for others and then in particular drivers of cars and lorries.

For this reason bicycles are provided with reflectors as well as lights. Both easily get dirty with time and the bicycle lights in particular are subjected to a number of contradicting requirements. The primary object is of course to secure good visibility in order to avoid accidents. Furthermore the lights must be able to withstand the influence of weather and in particular water. They must further in practice today be fed with electricity in one form or the other, e.g. by a generator, which some people find increase the pedal work too much. The alternative is to use a battery, which requires a rather frequent change of batteries which increases the costs.

If the light is provided with electricity from the outside a constant problem is bad contact due to oxidation. Oxidation is also a problem with lights with integrated batteries, in particular the switches often wear out prematurely due to this. If the connection is broken or if batteries run out an illegal and for the driver and others, dangerous situation occur.

In order to overcome the above drawbacks one object of the invention is to provide an electrical bicycle light that is not prone to weather influenced disruptions in the electric circuit.

The latest tendency is that bicycle drivers use battery powered lights that are removed from the bicycle when you leave it in order to prevent people with a low respect of others property to borrow light or batteries. However the lights are not really made to carry and thus in addition to the contact problems the lights are rather cumbersome to drag along.

In the view of the above problem another object of the invention is to provide a light that is easy to carry along.

SUMMARY OF INVENTION

The first of these objects is achieved by a sealed encasing of a light source and a battery between a glass and a back wall. The light source and battery serially coupled with each other and two terminal points that extend through the casing of the light to the exterior and that the circuit is closed by an electrically conductive fastening bracket for the light, that on mounting correct the contact points.

The second object is achieved by the bicycle light being constituted by a light emitting diode and a battery. Due to the great optical efficiency of the light emitting diode the battery will last a very long time.

Normally a light source can not be accepted inside a reflector since the light will not be sufficiently hermetically sealed and therefor the reflecting properties of the glass will be impaired by condensation.

Since however the light according to the invention is sufficiently closed, the glass can also, in part, constitute a reflector, which in turn improves the safety.

The switching on and off of the light is carried out by the light being removeable from the holder or bracket on the bicycle. The holder is preferably metallic and when the light is mounted thereon the contact points on the outside of the light are connected and the light is switched on. In particular, red light for rear bicycle lights and a yellow light for front lights. Since the switching on and off of the light is carried out by means of its mounting, oxidation problems will be greatly reduced, especially if the bracket is of stainless steel. Very small batteries and a light emitting diode can be used. A light emitting diode providing a light corresponding to that of an electric bulb of one Watt can be used about one hundred hours with only two pen light batteries. Since the batteries can be made so small the size of the combined light and reflector will no longer be a problem to carry along. There are no switches on the light that can allow water to enter into the light or the switch or foul the back of the reflector. In other words a very tough construction.

It should be mentioned that the light emitting diode (LED) preferably is of the type Gallium- Aluminium-Arsenid (Ga Al As layer on a Ga As substrate), normally marketed as "Super ultra bright" or "High super bright" in order to provide sufficient light.

Since the current drawn from the batteries of a LED even of this powerful type is very small, the decline in current efficiency when cold is unimportant.

From the teachings of the invention it is also apparent that a light provided with, preferably an external, switch of stainless steel will be very durable and weather resistant.

BRIEF DESCRIPTION OF THE DRAWINGS

Further advantages and features of the invention are apparent from the following description of preferred embodiments and developments of the invention. In the drawings

The FIGS. 6–10 show views similar to FIGS. 1–5 of another embodiment of the invention and FIGS. 11–15 the same views of a third embodiment.

DESCRIPTION OF PREFERRED AND VARIOUS EMBODIMENTS

Figure 2:
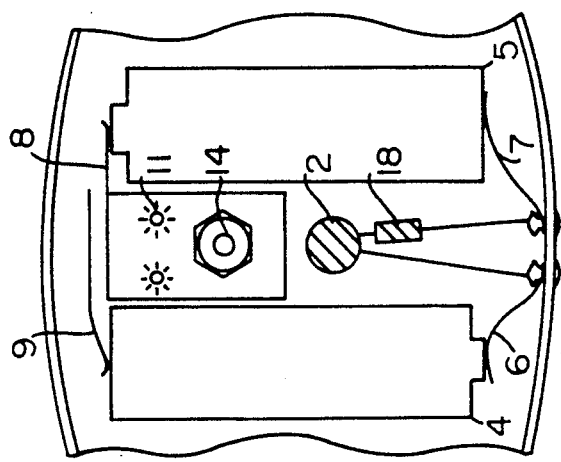
Figure 3:
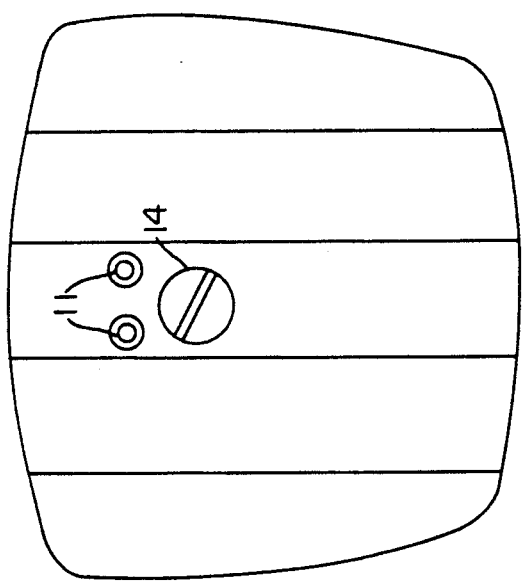
Figure 1:
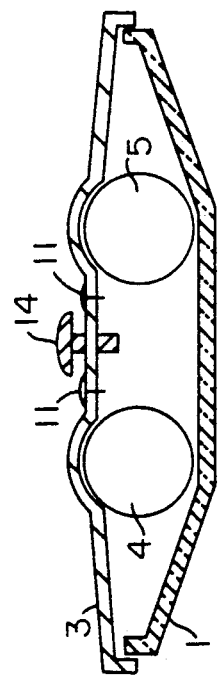
FIG. 1 shows a cross-section through a bicycle light in accordance with the invention, FIG. 2 the same light seen from the front, that is the side of the light where the light source is shown with the glass removed, FIG. 3 the rear side of the same light and FIG. 4 a detail of the fastening and contact means of the light and FIG. 5 the end of a fastening means for the light.
Figure 4:
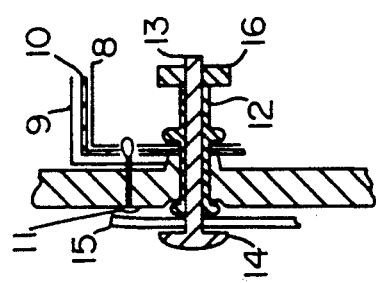
Figure 5:
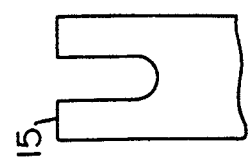
Figure 12:
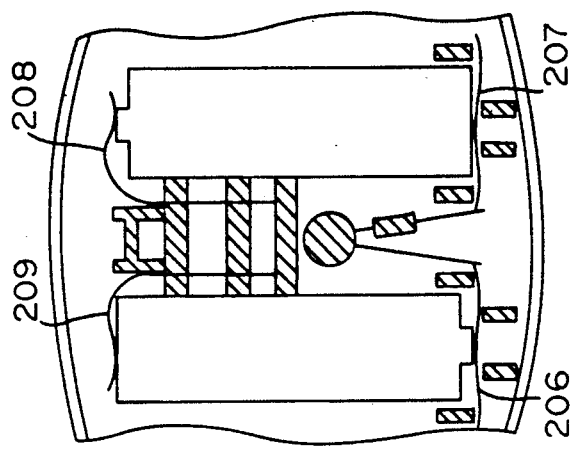
Figure 13:
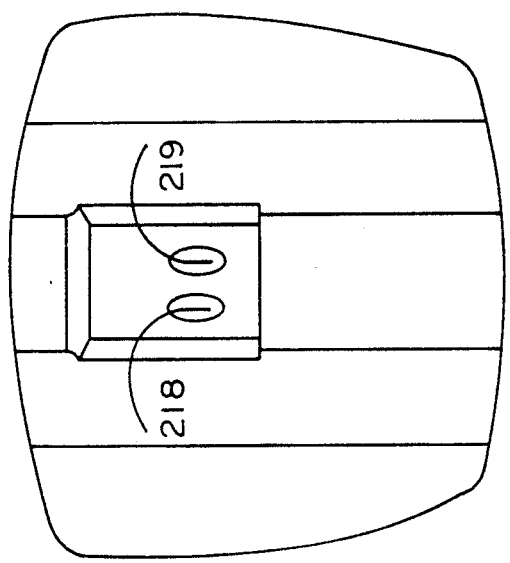
Figure 11:
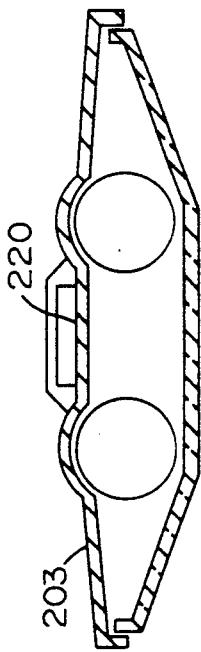
Figures 14, 15:
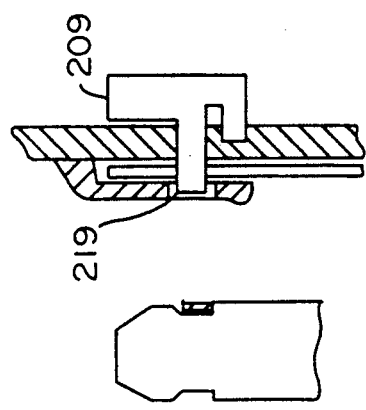

The light shown in FIG. 1 is constituted by a combined reflector and glass 1 of transparent plastic. In case it is a rear light for bicycle this glass and reflector is red and if it is a front light this reflector is of course clear or without colour. Behind the combined glass and reflector a light emitting diode (LED) 2 is located essentially in the middle of the glass behind a small window. But for the small spot where a light emitting diode 2 is mounted the combined reflector and glass is provided with reflecting prisms on the rear side. Since however no reflector made in this way is absolutely perfect the glass will be slightly and diffusely illuminated over its entire surface. The major part of the light energy is however emitted through the window straight out from the light defined by the angle of the reflector inside the LED. Some light is however diffusely distributed out to and through the reflector illuminating this and thus further improving the visibility. The light emitting diode is fastened to a rear wall or back 3. The glass is held of the back 3 of the light by means of screws, that are not shown, and between the back 3 and the glass 1 a sealing is preferably arranged.

In addition to the light emitting diode, two batteries 4 and 5 are arranged on each side of the light emitting diode. The batteries 4 and 5 are at their respectively downwards pointed ends supported by plates 6 and 7, which are of metal and riveted to the caseing or back 3. The plates or metal strips 6 and 7 are connected to the light emitting diode and a resistance in series. At the upper end, the batteries are in contact with plates 8 and 9. As can be seen from FIG. 2 and FIG. 4, these plates 8 and 9 are angled and both have parts lying flat against the back 3 of the light. Between the plates is arranged an insulating layer 10 of a suitable plastic. The layer 9 lies directly against the back 3 of the light and is riveted thereto by means of rivets 11 extending through the back 3. Also the plate 8 is fastened to the back 3 of the light. This is however done by means of a hollow rivet or popnut 12 that is threaded on the inside. In this thread a screw 13 is threaded. It is threaded so that a distance between the screw head 14 and the heads of the rivets 11 can be adjusted allowing for a fastening bracket 15 shown in FIG. 5 to be inserted under the screw head 14. In this position the screw 12 is locked by a locking nut 16. The fastening means 15 is preferably of stainless steel and when it is inserted between the screw head 14 and the rivets 11, electrical contact is achieved between the two plates 8 and 9 thus connecting batteries and light emitting diode allowing the latter to draw energy from the batteries and to emit light. The forklike fastening means 15 is preferably in its outer ends slightly bent towards the back of the light so that these ends can snap-in over the heads of the rivets 11. Since the forklike fastening means 15 is turned upwards and all the jolts and jarring that the light will be subjected to from a bicycle when mounted are directed upwards, these forces will tend to keep it located on its forklike fastening bracket. The very small possible inertia forces in the opposite direction are easily compensated for by the snap action and friction between the parts.

With the use of two pen light batteries and a powerful light emitting diode that emits light corresponding to that of an ordinary bulb of 1 Watt a total burning time of over a hundred hours will be achieved. This corresponds to one year of normal use. After one year of use the batteries should normally anyhow be discarded in order to prevent their leaking. In other words for one entire year the light can be used when bicycling in the dark and be kept in the pocket the rest of the time. As in particular is apparent from FIG. 1 the light is very small and handy and easily accomodated in a pocket.

Since the light is not left permanently on the bicycle it is not subjected so severely to oxidation effects but even if it was the mounting and demounting will rub off possible oxidation residues on mounting of the light.

Ordinary bulb light will draw much more current than the light according to the invention with a light emitting diode. As a result, the time between a noticeable decline in light and a totally flat battery is very much longer for the invented light. "Several tenths hours" instead of minutes, which improves safety considerable. This effect is even more pronounced if rechargeable batteries are used, since these "fall" even more absolutely.

The use of a light emitting diode also enables the use of stainless steel in the switching means since the corresponding increase in contact resistance is unimportant due to the small drawn current. The use of stainless steel gives in turn many advantages as has been mentioned above. Stainless steel contacts are however not practical for bulbs since the voltage drop will be too great.

In the FIGS. 6-10 a slightly altered light is shown. Corresponding parts have been designated the same reference numerals as in the FIGS. 1-5 but added with one hundred. The contact strips 106 and 107 at the bottom of the batteries have been bent so that the jolts of the bicycle can not make them yield thus securing that the batteries do not loose their contact. In this embodiment the plates 108 and 109 both themselves go straight through the back wall of the light and grip over the fastening bracket 115. In the fastening means 115 a hole 116 is arranged into which a ridge 117 of the outer plate 109 can grip. The bracket 115 is furthermore guided between the protrusions corresponding to the two batteries on the back side 103 of the light. Function and advantages of this light is essentially as for the first described embodiment.

It should perhaps be mentioned why a resistor is arranged in series with the light emitting diode. The reason is quite simply that all light emitting diodes are not alike and that in order to secure that they do not draw too much or too little current from the battery, thus shortening the life span of these, they have to be tested and paired to a resistor to secure the correct working conditions.

In FIGS. 11-15 yet another development of the invention is shown. The different parts in these figs has been given reference numerals corresponding to those of FIGS. 1-5, but added with two hundred. In this embodiment the metal strips 206 and 207 are placed between plastic lugs arranged in the rear casing or back 203 to prevent the batteries from sinking down. The upper plates 208 and 209 extend straight through the back of the light with lugs 218 and 219. Furthermore a pocket 220 is arranged on the back side of the light intended for the insertion of the fastening bracket 215 therein. The lugs 218 and 219 extend into the inside of the pocket and grip into recesses in the mounting means 215 so that a locking connection is obtained in this way.

What is claimed is:

1. Light comprising a battery, and a light source mounted in an electrically conductive mounting bracket for said light source, and wherein the circuit of said battery and light source extend to contact points, and wherein said mounting bracket closes said circuit and together with said contact points constitute a switch.

2. Light according to claim 1 characterized in that said light comprises a rear wall with fastening means for cooperating with said bracket, and a glass enclosing located between said fastening means, light source and batteries.

3. Light according to claim 1 characterized in that the glass is also a reflector.

4. Light according to claim 1 characterized in that the connection through the rear wall of the light is obtained by means of rivets.

5. Light according to claim 1 characterized in that the electrical connection through the rear wall is obtained by means of metallic plates.

6. Light according to claim 5 characterized in that the plates also serve as contact plates for two batteries.

7. Light according to claim 1 characterized in that the mounting means on the light include a vertical recess in the light and a screw arranged centrally in this recess gripping through a slot in said mounting bracket for the light.

8. Light according to claim 7 characterized in that the screw is adjustable so that the grip of the light on said bracket is adjustable.

9. Light according to claim 1 characterized in that a light emitting diode is used as said light source.

10. Light according to claim 1 characterized in that the fastening bracket is of stainless steel.

11. Light according to claim 1 characterized in that the contact points of the circuit that extend to the outside are of stainless steel.

* * * * *